(12) United States Patent
Lin

(10) Patent No.: US 10,496,140 B2
(45) Date of Patent: Dec. 3, 2019

(54) FIXING DEVICE FOR AN EXPANSION CARD

(71) Applicant: Nzxt Inc., City of Industry, CA (US)

(72) Inventor: Sam Lin, City of Industry, CA (US)

(73) Assignee: NZXT INC., City of Industry, CA (US)

( * ) Notice: Subject to any disclaimer, the term of this patent is extended or adjusted under 35 U.S.C. 154(b) by 89 days.

(21) Appl. No.: 15/718,362

(22) Filed: Sep. 28, 2017

(65) Prior Publication Data

US 2019/0094923 A1    Mar. 28, 2019

(51) Int. Cl.
*G06F 1/18* (2006.01)
*F21V 33/00* (2006.01)
*F21Y 115/10* (2016.01)

(52) U.S. Cl.
CPC .......... *G06F 1/186* (2013.01); *F21V 33/0004* (2013.01); *F21Y 2115/10* (2016.08)

(58) Field of Classification Search
CPC .......... G06F 1/185; G06F 1/186; G06F 1/184; G06F 1/183; G06F 1/187; G06F 1/181; H05K 7/1487; F21V 33/0004; F21V 33/004; F21Y 2115/10
See application file for complete search history.

(56) References Cited

U.S. PATENT DOCUMENTS

| 5,753,861 | A | * | 5/1998 | Hansen | H01R 4/70 174/136 |
| 2002/0181218 | A1 | * | 12/2002 | Hedler | H01L 23/13 361/803 |
| 2014/0125922 | A1 | * | 5/2014 | Terashima | G02B 6/0085 349/65 |
| 2016/0102847 | A1 | * | 4/2016 | Gotou | G02B 6/009 348/790 |

FOREIGN PATENT DOCUMENTS

DE    102006022135 A1 * 11/2007 ............. G06F 1/184

* cited by examiner

*Primary Examiner* — Dimary S Lopez Cruz
*Assistant Examiner* — Ingrid D Wright
(74) *Attorney, Agent, or Firm* — Muncy, Geissler, Olds & Lowe, P.C.

(57) ABSTRACT

A fixing device for an expansion card is installed on a frame of a desktop computer to fix an expansion card on the desktop computer. The fixing device includes at least two installation bases. After adjusting an interval between the installation bases, the installation bases are fixed to an opening of the frame by locking members. Each of the installation bases is provided with an installing through hole, such that an installation portion at the rear end of each of two fixing rods penetrates through the installing through. The front ends of the fixing rods vertically extend to form clamping portions to clamp the expansion card. The clamping portions and the expansion card are provided with a fixing batten to stabilize the expansion card.

9 Claims, 5 Drawing Sheets

FIXING DEVICE FOR AN EXPANSION CARD

BACKGROUND OF THE INVENTION

Field of the Invention

The present invention relates to a fixing device for a card within a desktop case, particularly to a fixing device with high adjustability for an expansion card.

Description of the Related Art

PCI Express (Peripheral Component Interconnect Express) is a high-speed serial computer expansion bus standard.

Presently, a PCIe slot in a desktop case externally connects with an expansion card to expand a physical layer and improve the performance of a computer. When the expansion card is connected with the PCIe slot, the expansion card is suspended from the PCIe slot. If the expansion card is too large or too heavy, the PCIe slot will be deformed or damaged due to gravity.

As a result, a jack used to support a video card is invented, as shown in FIG. 1. In FIG. 1, a supporting stand 90 is provided with a plurality of supporting plates 92 thereon. The supporting stand 90 is arranged in a desktop case 93, and the supporting plate 92 touches the bottom an expansion card. The supporting plate 92 supports the expansion card 94 lest a PCIe slot be deformed and damaged due to gravity. However, the jack does not effectively fix the expansion card 94. If a desktop computer shakes, the supporting stand 90 may be displaced. Then, the supporting plate 92 leaves the expansion card 94 so as not to support the expansion card 94. Owing to the weight of the expansion card 94, the PCIe slot gradually be deformed and damaged. In addition, the jack is difficultly installed in a desktop case provided with multiple expansion cards 94 therein. Since the desktop case has too small an inner space, force that the jack pushes the expansion card 94 is too large such that the components or the outer case of the expansion card 94 is easily damaged.

To overcome the abovementioned problems, the present invention provides a fixing device for an expansion card, so as to solve the afore-mentioned problems of the prior art.

SUMMARY OF THE INVENTION

A primary objective of the present invention is to provide a fixing device for an expansion card, which fixes expansion cards with various thicknesses and flexibly adjusts an interval between installation bases according to the number and the thickness of the expansion cards to install various expansion cards, thereby achieving the high adjustability and improving the flexibility in assembling the expansion cards.

Another objective of the present invention is to provide a fixing device for an expansion card, which arranges a fixing batten outside a fixing rod to improve the stability of an expansion card, lest the fixing device lose a supporting function due to the displacement of the expansion card.

To achieve the abovementioned objectives, the present invention provides a fixing device for an expansion card. The fixing device is installed on a frame of a desktop computer to fix at least one expansion card on the desktop computer. The fixing device comprises at least two installation bases arranged from top to bottom to correspond to an opening of the frame, each of the installation bases is provided with a locking member, the locking member and the installation base corresponded thereof are respectively arranged at two opposite sides of the opening, after adjusting an interval between two installation bases, each of the installation bases is fixed to the opening by the locking member, and each of the installation bases is provided with an installing through hole; at least two fixing rods, the rear end of each of the fixing rods has an installation portion, the front end of each of the fixing rods vertically extends to form a clamping portion, the installation portion of each of the fixing rods penetrates through the installing through hole of each of the installation bases, and the clamping portion of each of the fixing rods clamps the expansion card; and at least one fixing batten fixed to the clamping portion of the fixing rod and the expansion card to stabilize the expansion card.

Below, the embodiments are described in detail in cooperation with the drawings to make easily understood the technical contents, characteristics and accomplishments of the present invention.

DETAILED DESCRIPTION OF THE INVENTION

Figure 1:
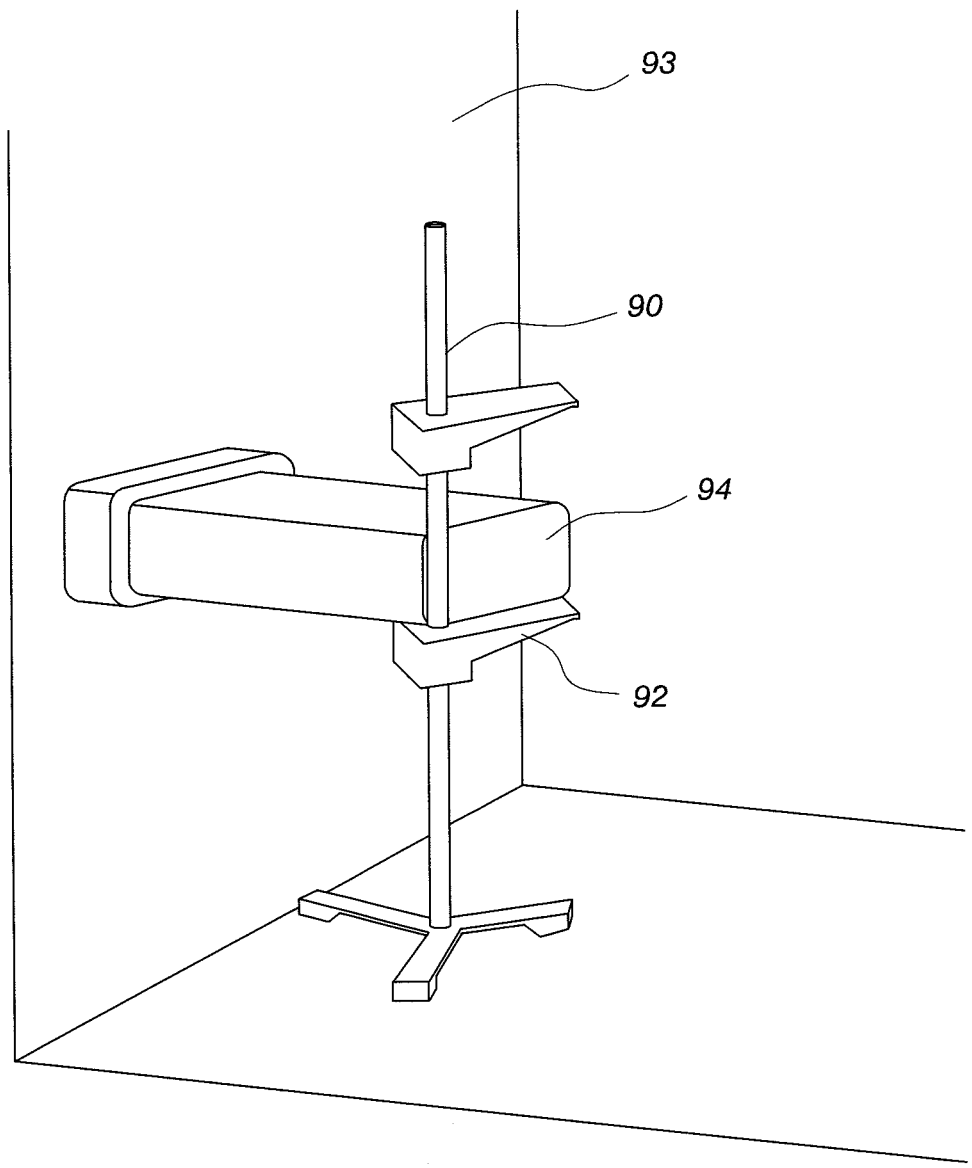
FIG. 1 is a perspective view of a jack in the conventional technology.
Figure 2:
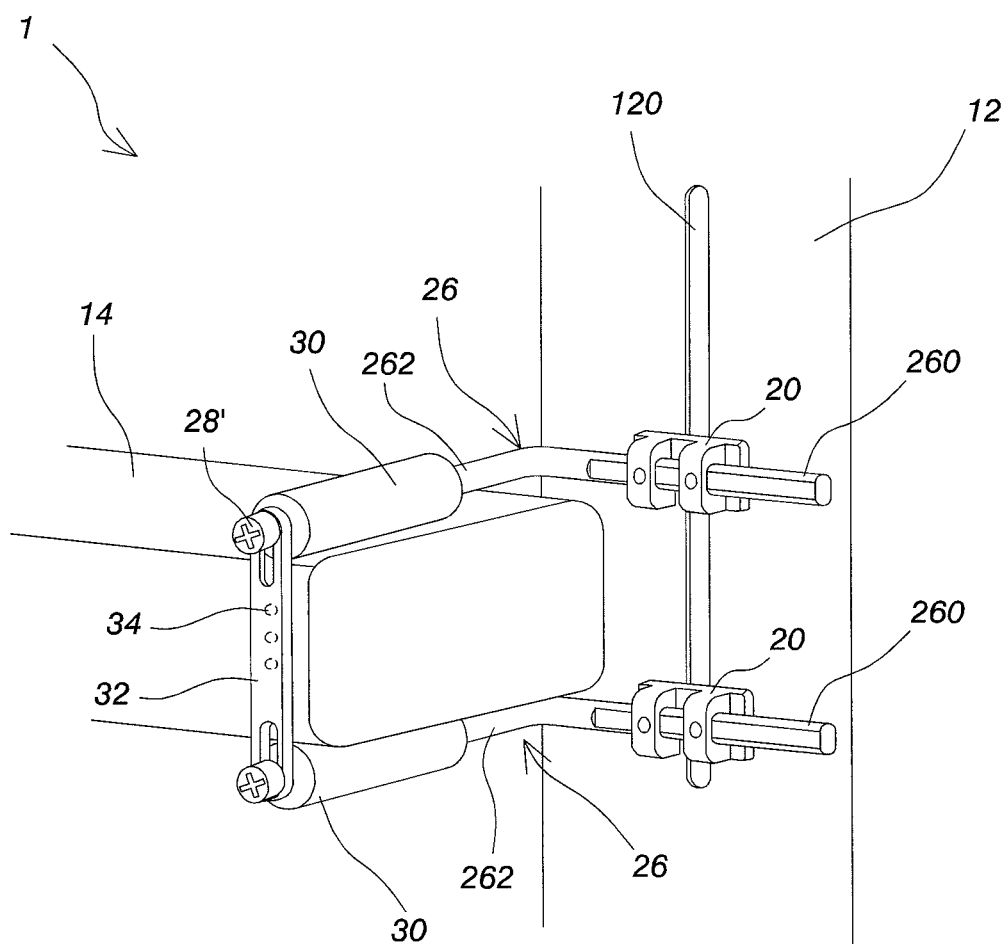
FIG. 2 is a perspective view of a fixing device for an expansion card according to an embodiment of the present invention.
Figure 3:
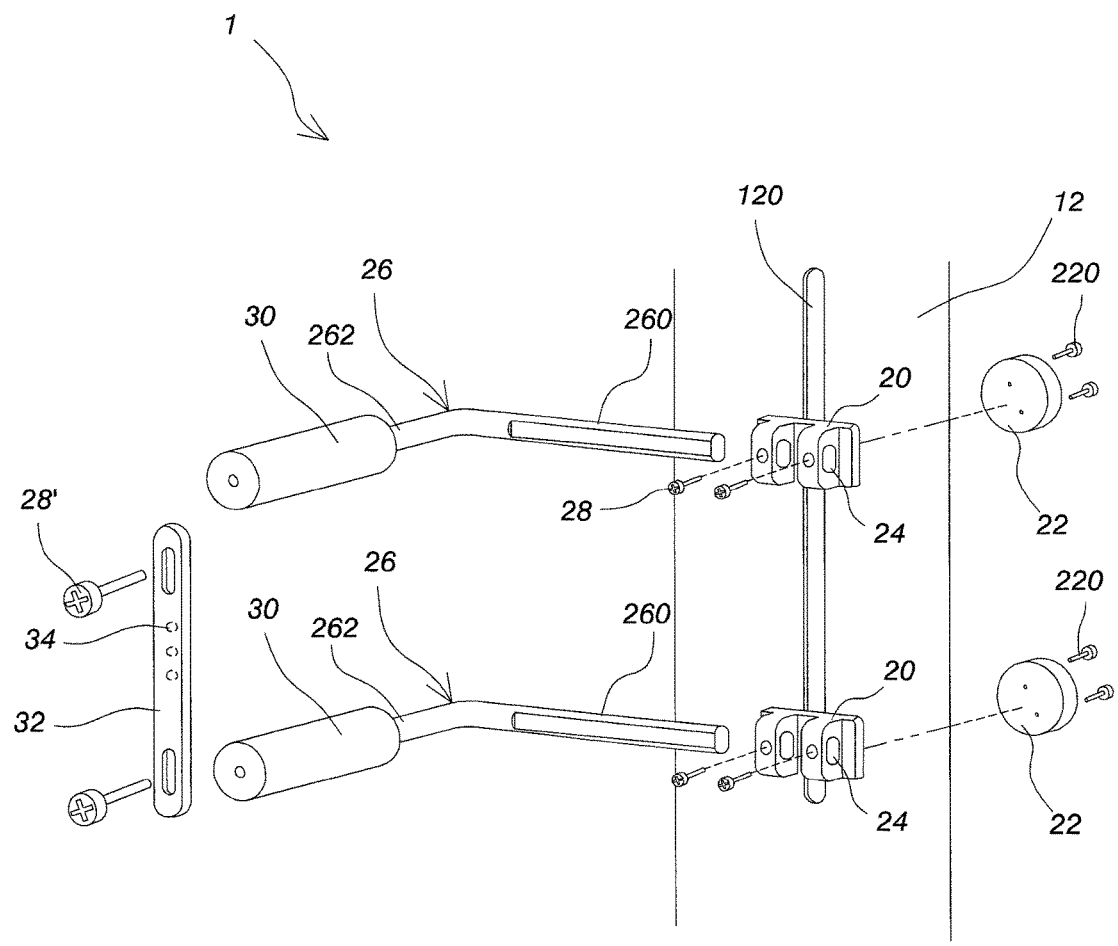
FIG. 3 is an exploded view of a fixing device for an expansion card according to an embodiment of the present invention.

Refer to FIG. 2 and FIG. 3. The fixing device 1 for an expansion card of the present invention is installed on a frame 12 of a desktop computer (not shown) to fix at least one expansion card 14 within the desktop computer. The fixing device 1 comprises at least two installation bases 20 arranged from top to bottom to correspond to an opening 120 of the frame 12. An interval between the installation bases 20 is adaptable according to the width of the expansion card 14. The installation bases 20 are respectively fixed to the opening 120 by two locking members 22. The locking member 22 and the installation base 20 corresponded thereof are respectively arranged at two opposite sides of the opening 120. The locking members 22 are screwed to the installation bases 20 by screws, thereby fixing the installation bases 20 to the opening 120 of the frame 12. Besides, each of the installation bases 20 is provided with an installing through hole 24 and a fixing rod 26 penetrates through the installing through hole 24. The embodiment exemplifies two fixing rods 26 made of metal. The rear end of each of the fixing rods 26 has an installation portion 260. The installation portion 260 of each of the fixing rods 26 penetrates through the installing through hole 24 of each of the installation bases 20. The front end of each of the fixing rods 26 vertically extends to form a clamping portion 262. The two clamping portions 262 clamp the expansion card 14. The clamping portion 262 is sleeved in a cushioning sleeve 30 made of silicone. When the two clamping portions 262 clamp the expansion card 14, the cushioning sleeve 30 can improve friction, produce the slip-proof effect, and prevent from collision to effectively protect and stabilize the expansion card 14. The lengths of the fixing rods 26 are adjusted when clamping the expansion card 14. After adjusting the length that the fixing rod 26 emerges from the installation base 20, the fixing rod 26 is fixed to the installing through hole 24 of the installation base 20 by a plurality of fixing elements 28, such as screws.

Refer to FIG. 2 and FIG. 3. The fixing device 1 further comprises at least one fixing batten 32. Using a plurality of fixing elements 28' such as screws, the fixing batten 32 is fixed to the clamping portions 262 of the fixing rods 26 and the expansion card 14 to intensely stabilize the expansion card 14, lest the fixing batten 32 lose a supporting function due to the displacement of the expansion card 14. The fixing batten 32 is a transparent fixing batten. The fixing batten 32 is further provided with at least one lighting element 34 therein. In the embodiment, light-emitting diodes (LEDs) with different color are installed in the fixing batten 32. The lighting element 34 is electrically connected with a power supply of the desktop computer. When the power supply is turned on, the power supply turns on the lighting element 34 to beautify and enrich the color of the fixing batten 32.

Figure 4:
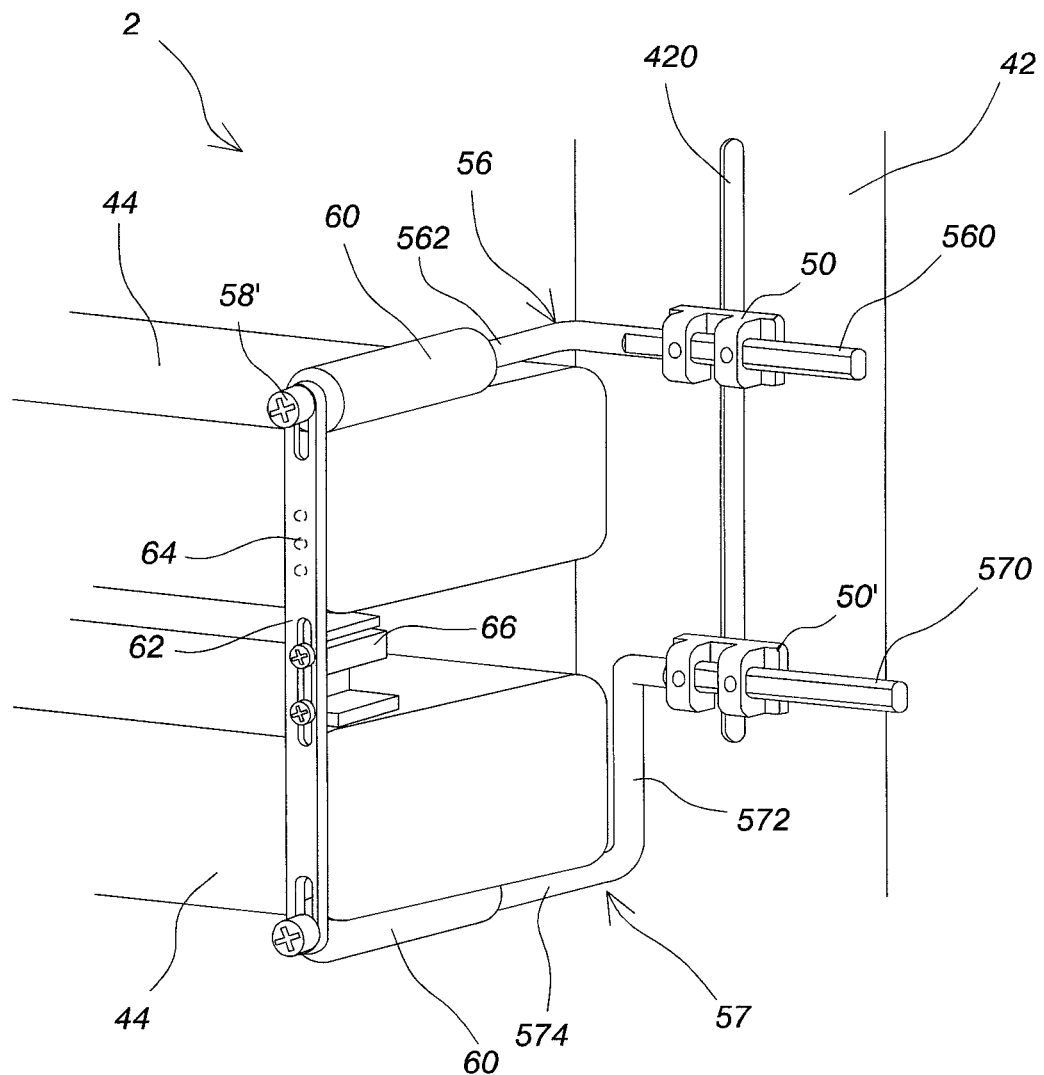
FIG. 4 is a perspective view of a fixing device for an expansion card according to another embodiment of the present invention.
Figure 5:
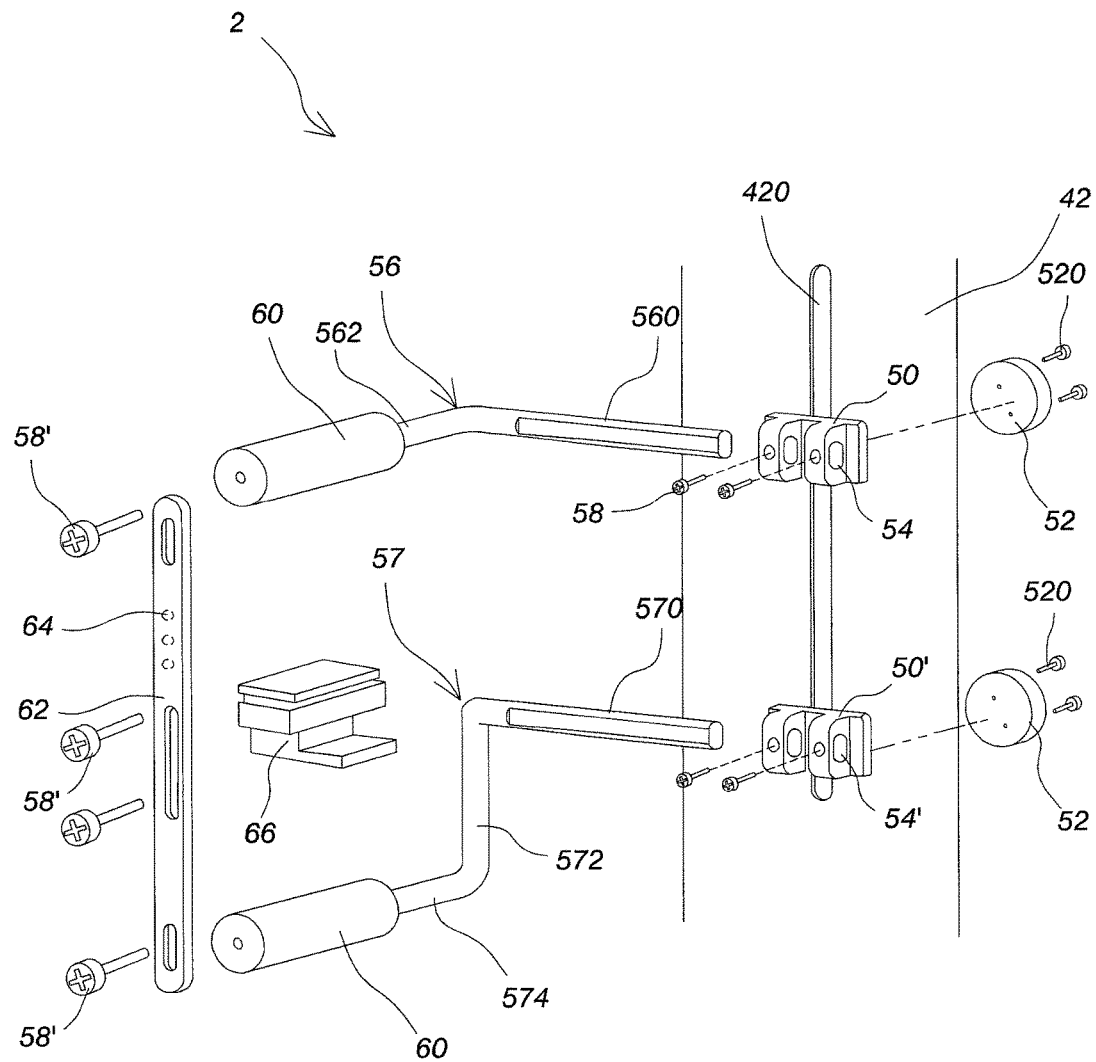
FIG. 5 is an exploded view of a fixing device for an expansion card according to another embodiment of the present invention.

In addition to the abovementioned embodiment, the present invention provides another embodiment of a fixing device 2 for an expansion card. Refer to FIG. 4 and FIG. 5. The fixing device 2 is installed on a frame 42 of a desktop computer (not shown) to fix two expansion cards 44 within the desktop computer. The fixing device 2 comprises at least two installation bases 50 arranged from top to bottom to correspond to an opening 420 of the frame 42. After adjusting an interval between the installation bases 50, the installation bases 50 are respectively fixed to the opening 420 by two locking members 52. The locking member 52 and the installation base 50 corresponded thereof are respectively arranged at two opposite sides of the opening 420. The locking members 52 are screwed to the installation bases 50 by screws, thereby fixing the installation bases 50 to the opening 420 of the frame 42. Besides, each of the installation bases 50 is provided with an installing through hole 54 and a fixing rod 56 penetrates through the installing through hole 54.

The embodiment exemplifies two fixing rods 56 and 57 made of metal. The structure of the fixing rod 56 is firstly explained. The installation portion 560 of the rear end of the fixing rod 56 penetrates through the installing through hole 54 of the installation base 50. The front end of the fixing rod 56 vertically extends to form a clamping portion 262. The installation portion 570 of the rear end of the fixing rod 57 penetrates through the installing through hole 54' of the installation base 50'. The middle portion of the fixing rod 57 downwardly extends to form an extending portion 572. The front end of the fixing rod 57 is vertical to the extending portion 572 to form a clamping portion 574. Since the extending portion 572 is added between the installation portion 570 and the clamping portion 574 to increase an interval between the fixing rods 56 and 57, more expansion cards 44 are installed between the fixing rods 56 and 57. The clamping portions 562 and 574 are respectively sleeved in two cushioning sleeves 60 made of silicone to improve friction, produce the slip-proof effect, and prevent from collision. After adjusting the lengths of the fixing rods 56 and 57, the fixing rods 56 and 57 are respectively fixed to the installing through holes 54 and 54' by a plurality of fixing elements 58 such as screws.

Refer to FIG. 4 and FIG. 5. When the expansion cards 44 are installed between the two fixing rods 56 and 57, a supporting member 66 is installed between the expansion cards 44 to support the expansion cards 44, lest the expansion cards 44 touch each other. The clamping portions 562 and 574 of the fixing rods 56 and 57 and sides of the expansion cards 44 and the supporting member 66 are provided with a fixing batten 62. The fixing batten 62 is fixed to the sides of the expansion cards 44 and the clamping portions 562 and 574 of the fixing rods 56 and 57 by fixing elements 58', such as screws. Then, the side of the supporting member 66 is fixed to the fixing batten 62 by the fixing elements 58' to stabilize the supporting member 66. As a result, the fixing batten 62 can fix the expansion cards 44 more stably, lest the fixing device lose a supporting function due to the displacement of the expansion card 44. On top of that, the fixing batten 62 is a transparent fixing batten. The fixing batten 62 is provided with a plurality of lighting elements 64 therein. The lighting elements 64 are light-emitting diodes (LEDs) with different color. The lighting elements 64 are electrically connected with a power supply of the desktop computer. When the power supply is turned on, the power supply turns on the lighting elements 64 to beautify and enrich the color of the fixing batten 62.

In conclusion, the present invention not only fixes expansion cards with different sizes and but also adjusts an interval between the expansion cards according to the number and the thicknesses of the expansion cards to install expansion cards with different shapes, thereby achieving the high adjustability and improving the flexibility in assembling the expansion cards. In addition, the present invention installs the fixing batten outside the fixing rod to fix the expansion card more stably, lest the fixing device lose a supporting function due to the displacement of the expansion card.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A fixing device for an expansion card, the fixing device installed on a frame of a desktop computer to fix at least one expansion card in the desktop computer, and the fixing device comprising:

at least two installation bases arranged from top to bottom to correspond to an opening of the frame, each of the at least two installation bases is provided with a locking member, the locking member and the installation base corresponded thereof are respectively arranged at two opposite sides of the opening, after adjusting an interval between two the installation bases, each of the at least two installation bases is fixed to the opening by the locking member, and each of the at least two installation bases is provided with an installing through hole;

at least two fixing rods, a rear end of each of the at least two fixing rods has an installation portion, a front end of each of the at least two fixing rods vertically extends to form a clamping portion, the installation portion of each of the at least two fixing rods penetrates through the installing through hole of each of the at least two installation bases, and the clamping portion of each of the at least two fixing rods clamps the expansion card; and at least one fixing batten fixed to the clamping portion of the fixing rod and the expansion card to stabilize the expansion card;

wherein when two the expansion cards are installed between the at least two fixing rods, a supporting member is installed between the two the expansion cards and fixed to a side of the at least one fixing batten.

2. The fixing device for the expansion card according to claim 1, wherein the at least one fixing batten is a transparent fixing batten, the fixing batten is further provided with at least one lighting element therein electrically connected with a power supply of the desktop computer, and when the power supply is turned on, the power supply turns on the at least one lighting element.

3. The fixing device for the expansion card according to claim 2, wherein the at least one lighting element is a light-emitting diode (LED).

4. The fixing device for the expansion card according to claim 1, further comprising a plurality of fixing elements fixing the at least one fixing batten to the clamping portion of each of the at least two fixing rods and the at least one expansion card and fixing each of the at least two fixing rods to the installing through hole of each of the at least two installation bases.

5. The fixing device for the expansion card according to claim 4, wherein the plurality of fixing elements are screws.

6. The fixing device for the expansion card according to claim 1, wherein the clamping portion of each of the at least two fixing rods is sleeved in a cushioning sleeve.

7. The fixing device for the expansion card according to claim 6, wherein the cushioning sleeve is made of silicone.

8. The fixing device for the expansion card according to claim 1, wherein each of the at least two fixing rods is made of metal.

9. The fixing device for the expansion card according to claim 1, wherein at least one the fixing rod is further provided with an extending portion between the installation portion and the clamping portion, and the extending portion is vertical to the installation portion and the clamping portion.

* * * * *